3,592,805
COMPLEX OF ORGANIC AMINE WITH A COMPLETELY HALOGENATED ACETONE AND METHOD OF PREPARATION

Karoly Szabo, Pleasantville, N.Y., and Ashley H. Freiberg, Santa Clara, Calif., assignors to Stauffer Chemical Company, New York, N.Y.
No Drawing. Continuation of application Ser. No. 308,632, Sept. 13, 1963, which is a continuation-in-part of application Ser. No. 221,456, Sept. 5, 1962. This application Feb. 17, 1969, Ser. No. 802,740

Int. Cl. A01n 9/16, 9/20, 9/22
U.S. Cl. 260—140                                2 Claims

ABSTRACT OF THE DISCLOSURE

A chemical complex of the following formula:

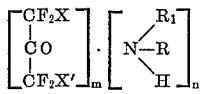

wherein $R_1$ and $R_2$ are hydrogen: an alkyl radical of from 1 to 18 carbon atoms; an alkyl radical of from 1 to 18 carbon atoms; an alkynyl radical of from 1 to 9 carbon atoms; a non-aromatic carbocyclic radical of from 5 to 6 carbon atoms; an aralkyl radical wherein the alkyl portion is lower alkyl and the aryl portion is a phenyl or naphthyl radical; phenyl radical; naphthyl radical; an amino radical; cyano or a heterocyclic radical; and when taken together $R_1$ and $R_2$ may form a heterocyclic ring system; it being provided that the aforesaid radicals may have attached thereto the functional moiety: halogen, —CN, —SCN, —COOR, —SO$_2$NR$_2$, —SOR, —SO$_3$R, —CONR$_2$, —CONHR, —OH, —SH, —NR$_2$, —NHR, —NH$_2$, —OR, —SR, —OC(O)R, —CHO, $$-\overset{O}{\overset{\|}{C}}-, \quad -CH\overset{OR}{\underset{OR}{\diagdown}}$$

—NO$_2$ and —N=N, wherein R can be an organic radical of the type above defined for $R_1$ and $R_2$; X and X' are fluorine or chlorine, and $n$ and $m$ are integers of from 1 to 3 with the proviso that $n$ and $m$ are identical when equal to unity; and a method for preparing said chemical complex by reacting 1 to 2 moles of an organic amine of the formula

wherein $R_1$ and $R_2$ have the values as above designated, with 1 to 2 moles of a fully halogenated acetone of the formula

wherein X and X' have the values as above designated, and isolating the so-formed chemical complex and the use of said chemical complexes as fungicides.

---

This application is a streamlined continuation of Ser. No. 308,632 filed Sept. 13, 1963, now abandoned, which is a continuation-in-part application of Ser. No. 221,456 filed Sept. 5, 1962, now abandoned.

This invention relates to the control of microorganisms such as fungi and the like. More particularly, the invention pertains to the control of fungi by means of systematically working fungicidal compositions containing as their active component a complex of an organic amine with a completely halogenated acetone.

In accordance with the present invention, it has been discovered that certain completely halogenated acetones having at least two fluorine atoms per methyl group and in which the two remaining halogens are fluorine or chlorine are capable of forming chemical complexes with relatively basic organic amines thereby engendering a family of chemical adducts which have proved to be unusually potent as systemic fungicides, and the provision of such complexes and a method of preparing them constitutes the principal object of the present invention. It is also an important object of the invention to provide fungicidal compositions containing at least one of the aforesaid complexes. Other objects and purposes will become manifest subsequently.

The systemic fungicides of the present invention can be represented by the following general formula:

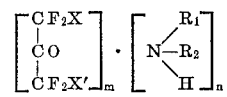

wherein $R_1$ and $R_2$ can be hydrogen, an alkyl radical of from 1 to 18 carbon atoms, an alkenyl radical of from 1 to 18 carbon atoms, an alkynyl radical of from 1 to 9 carbon atoms, a non-aromatic carbocyclic radical of from 5 to 6 carbon atoms, an aralkyl radical wherein the alkyl portion is a lower alkyl and the aryl portion is a phenyl or naphthyl radical, an aromatic hydrocarbon radical such as a phenyl or naphthyl radical, cyano, an amino radical which may be substituted by lower alkyl and aryl radicals having from 1 to 2 aromatic rings and a heterocyclic radical, and taken together $R_1$ and $R_2$ may form a heterocyclic ring system as exemplified by pyrrole, pyrrolidine, imidazole, imidazoline, imidazolidine, piperazine, morpholine, isoxazine, dioxazole, tetrazole, and the like, it being provided that the aforesaid radicals may have attached thereto such functional moieties as halogen, e.g. chlorine, bromine or fluorine, —CN, —SCN, —COOR, —SO$_2$NR$_2$, —SO$_2$R, —SOR, —SO$_3$R, —CONR$_2$, —CONHR, —OH, —SHS, —NR$_2$, —NHR, —NH$_2$, —OR, >CO, —SR, —OC(O)R, —CHO,

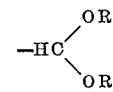

—NO$_2$ and —N≡N—, wherein R can be a hydrocarbon radical of the type defined for $R_1$ and $R_2$, X and X' represent a halogen selected from the class consisting of fluorine and chlorine, and $n$ and $m$ are integers of from 1 to 3, it being understood that when $n$ and $m$ are identical they are equal to unity.

Specific values which may be assigned to $R_1$ and $R_2$ of the above given formula are set forth in the following test:

Alkyl radicals

| | |
|---|---|
| methyl | 2-methoxyethyl |
| ethyl | 3-ethoxypropyl |
| n-propyl | 3-nitropropyl |
| isopropyl | formylmethyl |
| n-pentyl | 3-hydroxy-2-oxo-propyl |
| isopentyl | ethoxycarbonylethyl |
| isobutyl | 2-acetomidoethyl |
| tert.-butyl | 2-N,N-dimethylacetomidoeth |
| n-hexyl | thiocyanatoethyl |
| isohexyl | phenethyl |
| n-nonyl | 3-ethylmercaptopropyl |
| n-decyl | 2-fluoroethyl |
| bromoethyl | 2-cyanoethyl |
| chloroethyl | 2-butoxypropyl |

Alkyl radicals

| | |
|---|---|
| 2-nitrobutyl | 2-chloro-2-nitropropyl |
| 2-dimethylaminoethyl | 2,3-dibromopropyl |
| 2-diethylaminoethyl | 3,3,3-trichloro-2-nitropropyl |
| 2,3-dihydroxypropyl | 2-propoxyethyl |

Ethylenically unsaturated radicals

| | |
|---|---|
| allyl | 5-hexenyl |
| methallyl | 9-decenyl |
| ethallyl | 2-methyl-1-hexenyl |
| 1-butenyl | 3-ethyl-1-hexenyl |
| 2-butenyl | 4,4-diethyl-1-hexenyl |
| 3-butenyl | 1-heptenyl |
| 2-methyl-1-butenyl | 6-heptenyl |
| 2-methyl-3-butenyl | 4,4-dimethyl-1-octenyl |
| 1-pentenyl | 4-ethyl-2-octenyl |
| 2-pentenyl | 1-octenyl |
| 3-pentenyl | 2-octenyl |
| 4-pentenyl | 3-octenyl |
| 2-methyl-1-pentenyl | 4-octenyl |
| 2-ethyl-1-pentenyl | 7-octenyl |
| 2-ethyl-4-pentenyl | 4,4-dimethyl-2-octenyl |
| 3,3-dimethyl-1-pentenyl | 1-nonenyl |
| 1-hexenyl | 2-nonenyl |
| 2-hexenyl | 1-decenyl |
| 3-hexenyl | 8-nonenyl |
| 4-hexenyl | 2-decenyl |

Acetylenically unsaturated radicals

| | |
|---|---|
| 1-propynl | 7-octynyl |
| 2-propynyl (propargyl) | 2-ethyloctynyl-3 |
| 1-hexynyl | 1-bromo-2-hexynyl |
| 3-hexynyl | 3,5-dimethyl-1-hexynyl |
| 1-octynyl | |

Non-aromatic carbocyclic radicals

| | |
|---|---|
| cyclopentyl | 2-cyclohexenyl |
| cyclohexyl | 3-cyclohexenyl |
| 1-cyclopentenyl | 2(3-cyclohexenyl)ether-3- |
| 2-cyclopentenyl | vinylcyclohexyl |
| 3-cyclopentenyl | 4-ethyl-1-cyclohexenyl |
| 4-vinylcyclohexyl | 4-isopropyl-2-cyclohexenyl |
| 1-cyclohexenyl | |

Phenyl and naphthyl radicals

| | |
|---|---|
| phenyl | 2,4-dichlorophenyl |
| 2-chlorophenyl | 4-tolyl |
| 4-chlorophenyl | 4-chloromethylphenyl |
| 4-fluorophenyl | 1-naphthyl |
| 4-hydroxyphenyl | 4-chloro-1-naphthyl |
| dichlorophenyl | 1-methyl-2-naphthyl |
| 4-cyanophenyl | 2-naphthyl |
| 4-diethylaminophenyl | 4-ethoxyphenyl |

Heterocyclic radicals

| | |
|---|---|
| 2-pyridyl | diazinyl |
| 3-pyridyl | 2-thiazolidyl |
| oxazolyl | 4,5-dimethyl-2-thiazolidyl |
| thiazolyl | 2-pyrimidyl |
| pyrrolyl | 4-phenyl-2-oxazolyl |
| triazolyl | pyranyl |
| tetrazolyl | benzimidazolyl |
| oxadiazolyl | pyrazolonyl |
| oxatriazolyl | β-naphthothiazolyl |
| diazolyl | triazinyl |
| furfuryl | oxazinyl |

In general, the compounds as contemplated herein are prepared by chemically combining in molar proportions as above shown in the general formula the halogenated acetone and a basic amine component of the formula

wherein $R_1$ and $R_2$ have the values as previously designated. The reaction is conveniently carried out in the presence of a normally liquid organic solvent, and in this connection reference is made to the lower ketones as exemplified by acetone, methylethylketone, and the like, alkyl cyanides, e.g. acetonitrile, and saturated aliphatic and aromatic hydrocarbons as well as their normally liquid chlorinated derivatives such as methylene dichloride, carbon tetrachloride, chloroform, ethylene dichloride, chlorobenzene, m-dichlorobenzene, etc. With the more reactive amines, usually those of fairly high basicity, the reaction with the fluoroacetone can be rather vigorous and commonly occurs spontaneously on bringing together the reactants, necessitating external cooling means. On the other hand, the less reactive amines may require external heating in order to complete formation of the complex.

It is to be understood that the term "relatively basic amine" refers to those organic amines which form stable salts with strong acids as exemplified by sulfuric acid, hydrochloric acid, hydrobromic acid, perchloric acid, and the like. By "stable amine salts" is mean those which can be isolated and are stable under normal or ambient conditions.

Although the amine-halogenated complexes of the invention exert an overall influence on the metabolism of a wide spectrum of plant life, they are particularly effective in controlling the growth of fungi and other similar types of microorganisms. In general, we have found that the parasitic undifferentiated microorganisms are to a considerable degree more susceptible to the toxicants than the highly organized members of the plant kingdom. The aforesaid property is especially useful where it is desired to protect a valuable food crop against infection from attacking plant parasites. For instance, the compounds can be safely applied to bean plants to protect them against rust and mildew.

As previously pointed out, the complexes of the invention are systemic fungicides and this unexpected finding greatly increases their usefulness and versatility. As those skilled in the art are aware, a systemic fungicide is taken up internally by the plant to which it is applied and lodges in the plant tissues while still retaining toxicological properties. Obviously, systemic toxicants are not subject to weathering since they are confined within the interstices of the plant tissues which are thus internally immunized against the attack of harmful microorganisms such as fungi, molds, rust and the like.

Preparations suitable for fungicidal applications may be prepared in the form of dusts or sprays. For instance, a dust is prepared by intimately blending the halogenated acetone-amine complex with a finely divided solid carrier of which talc, diatomaceous earth, pyrophyllite, hydrated silica, clay and bentonite are typical examples. The active component normally comprises about 1 to 15% of the total mixture. Moreover, it is a common practice to employ wetting agents to facilitate dispersing the active material in the event the dusts are added to water. Typically, a wettable powder may comprise 20 to 50% of the complex, 45 to 75% of one of the aforementioned finely divided solids, and 1 to 5% of a wetting agent. The aforesaid mixtures can be further diluted if desired. Exemplary wetting agents are the sodium alkylbenzenesulfonates, sodium dodecyl sulfate, and the nonionic polyethers as exemplified by the alkylphenoxypolyethoxyethanols. In use, the wettable powder is stirred up in water and the resultant liquid sprayed on plants for protection against fungus diseases. Another common procedure for incorporating the toxicants of the invention in a form suitable for application to plants consists of dissolving the toxicant in an organic solvent such as xylene, toluene, ethylenedichloride followed by emulsifying the resulting solution in water in the presence of a dispersing agent. The solvent solution can also be applied directly.

In carrying out systemic fungicidal tests, 60 ml. of a solution containing the compound undergoing evaluation was diluted until the concentration was 50 parts per million and the resultant diluted solution then placed in small tubes. A pinto bean plant was inserted in each tube using a cotton plug to support the seedling and also to retard evaporation. After 48 hours, two plants were inoculated with bean rust. Comparison between the treated and untreated plants was then made and the results evaluated. In these tests, the compound of Example 11 gave 100% control at a concentration of 1 part per million which, it will be noted, was the lowest concentration tested. Manifestly, this compound exhibits an unusually high degree of activity as a systemic fungicidal agent.

For specific instructions and directions for preparing the aforementioned complexes, reference is now made to the following examples which are inserted only for the purpose of illustrating the invention. It will be appreciated by those skilled in the art to which the invention pertains that various modifications and ramifications can be effected without departing from the spirit and scope thereof.

EXAMPLE 1

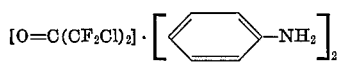

20.0 g. of sym. dichlorotetrafluoroacetone was diluted with 50 ml. of methylenedichloride and to the resulting solution was added gradually 9.3 g. of aniline. An exothermic reaction ensued, the result of which was to cause refluxing of the reaction. Following the addition of the amine, the reaction mixture was distilled under reduced pressure in order to remove all volatile products. There was obtained 19.5 g. of a slightly yellow residual oil which gradually solidified on cooling. The crude product was triturated with about 30 ml. of hexane, from which was obtained 15 g. of a white solid melting at 38° C. Analytical data and molecular weight determination were in consonance with the above depicted structure.

EXAMPLE 2

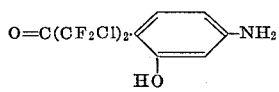

The procedure of Example 1 was again carried out but using equal molar proportions of sym. dichlorotetrafluoroacetone and m-aminophenol. In general, the results were in consonance with those of the first example. After purification by crystallization from ether, there was obtained a light tan solid, the chemical analysis of which corresponded to the above depicted structure. This is an example of a complex wherein the molar ratio of reactants is 1:1.

EXAMPLE 3

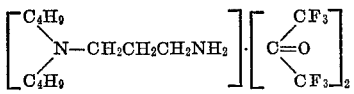

4.8 g. of di-n-butylamino propylamine was dissolved in acetone and to the resulting solution was added 11.0 g. of hexafluoroacetone. After the initially exothermic reaction had subsided, the reaction mixture was subjected to reduced pressure and the volatile components distilled off. The desired product was obtained in the form of a yellow, viscous, oily residue which solidified on standing to a light yellow solid. The yield of product was 13 g.; M.P. 124–126° C.

EXAMPLE 4

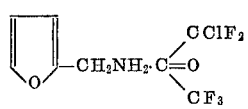

Chloropentafluoroacetone was dissolved into a mixture consisting of 4.8 g. furfurylamine and 30 ml. of methylene chloride, the introduction being continued until 5.5 g. of the halogenated acetone had been absorbed. After removal of the volatile components from the reaction mixture, there was obtained 10.0 g. of a residual yellow oil having an $N_D^{25}$ of 1.4418.

EXAMPLE 5

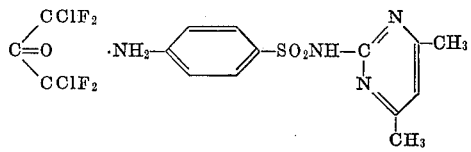

7.0 g. of sym. dichlorotetrafluoroacetone was slowly added to a mixture of 9.2 g. of sulfamethazine suspended in 20 ml. of acetonitrile. There resulted an exothermic reaction with concomitant dissolution of the amine adduct. After the reaction was completed, as indicated by the falling temperature, the product precipitated as a voluminous, light yellow solid. The product was isolated by filtration and after drying amounted to 14.0 g. and decomposed at 120–125° C.

EXAMPLE 6

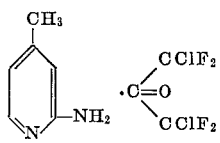

4.8 g. of 2-amino-4-picoline was suspended in 40 ml. of methylene chloride and to the resulting mixture was added 10.0 g. of sym. dichlorotetrafluoroacetone. After the addition, the picoline underwent dissolution and after removal of the volatile components by distillation, there was obtained 14.7 g. of a white solid which melted at 115–117° C.

EXAMPLE 7

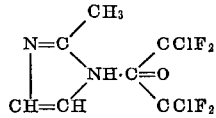

4.1 g. of 2-methyl imidazole was suspended in 30 ml. of methylene dichloride to which was added 10.0 of sym. dichlorotertafluoroacetone. There occurred immediately a rather mild exothermic reaction followed by simultaneous separation of the addition product. Isolation was effected by filtering off the white solid; its M.P. was 96–100° C.

EXAMPLE 8

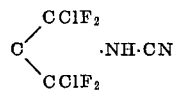

4.2 g. of cyanamide and 20.0 g. of sym. dichlorotetrafluoroacetone were added to 60 ml. of acetonitrile and the mixture refluxed for 20 minutes. During this period, the initially clear solution became turbid and ultimately there precipitated therefrom a white solid. The reaction mixture was allowed to cool to room temperature and the white precipitate separated by filtration. A second crop crysallized out on concentrating the mother liquor. The total yield of product was 23.0 g., having a M.P. of 265° C.

EXAMPLE 9

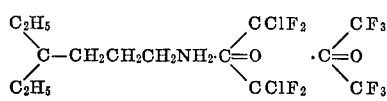

3.25 g. (0.025 M) diethylaminopropylamine was mixed with 20 ml. of methylene dichloride. To this solution was added 5.0 g. (0.025 M) of sym. dichlorotetrafluoroacetone. After the initially mild exothermic reaction had subsided, the mixture was allowed to cool to room temperature followed by the addition of 20 ml. of acetone and 4.1 g. (0.025 M) of hexafluoroacetone. The temperature of the reaction rose to about 40° C. and then gradually dropped back to room temperature. The reaction mixture was subjected to reduced pressure for removal of excess solvent and volatile components, after which there remained 13.0 of a residual viscous, yellow oil having an $N_D^{25}$ of 1.4145. The chemical and instrumental analyses of the product was in consonance with the above depicted structure and it is an example of an amine halogenated acetone complex in which two different halogenated acetone adducts are combined in the same complex.

Using the procedure as set forth in the previous examples, complexes of various halogenated acetones were prepared from the amines listed below.

| Example No. | Amine | Halogenated acetone¹ | Ratio—amine: halog. acetone | Characterization |
|---|---|---|---|---|
| 10 | $NH_3$ | 4FK | | White solid, M.P. 56° C. |
| 11 | $NH_2 \cdot NH_2$ | 4FK | | Brown oil, $n_D^{25}=1.4213$. |
| 12 | $C_8H_{17} \cdot NH_2$ | 4FK | | Dark yellow oil, $n_D^{25}=1.4345$. |
| 13 | $C_9H_{19} \cdot NH_2$ | 4FK | | Yellow oil, $n_D^{25}=1.4325$. |
| 14 | $C_{12}H_{25}NH_2$ | 4FK | | Yellow oil, $n_D^{25}=1.4405$. |
| 15 | $iC_3H_7NH_2$ | 4FK | | White solid, M.P. 52° C. |
| 16 | $C_{18}H_{37} \cdot NH_2$ | 4FK | | White solid, M.P. 70° C. |
| 17 | $C_{10}H_{21}NH_2$ | 4FK | 1:1 | Yellow oil, $n_D^{25}=1.4405$. |
| 18 | C₆H₅–CH₂–NH(CH₃) | 4FK | | Orange oil, $n_D^{25}=1.4909$. |
| 19 | C₆H₅–CH₂–NH₂ | 4FK | | White solid, M.P. 75° C. |
| 20 | $(C_2H_5)_2NH$ | 4FK | | Yellow oil, $n_D^{25}=1.4260$. |
| 21 | 2-Cl–C₆H₄–NH₂ | 4FK | 2:1 | Straw yellow oil, $n_D^{25}=1.5265$. |
| 22 | 4-Cl–C₆H₄–NH₂ | 4FK | 2:1 | Brown oil, $n_D^{25}=1.5225$. |
| 23 | 4-CH₃–C₆H₄–NH₂ | 4FK | 2:1 | White solid, M.P. 48° C. |
| 24 | 4-(CH₃)₂N–C₆H₄–NH₂ | 4FK | 1:1 | Grey solid, M.P. 63–69° C. |
| 25 | 4-HO–C₆H₄–NH₂ | 4FK | 2:1 | Grey solid, decomposes above 106° C. |
| 26 | 2-NO₂–C₆H₄–NH₂ | 4FK | 1:1 | Yellow solid, M.P. 110° C. |
| 27 | pyrrolidine (CH₂–CH₂–CH₂–CH₂–NH) | 4FK | | Orange oil, $n_D^{25}=1.4478$. |
| 28 | piperidine | 4FK | 2:1 | Yellow oil, $n_D^{25}=1.4460$. |
| 29 | 2,4-Cl₂–C₆H₃–NH₂ | 4FK | 2:1 | Yellow oil, $n_D^{25}=1.5496$. |
| 30 | 3,4-Cl₂–C₆H₃–NH₂ | 4FK | 2:1 | Brown oil, $n_D^{25}=1.5620$. |
| 31 | 2,6-(CH₃)₂–C₆H₃–NH₂ | 4FK | 2:1 | Brown solid, M.P. 60° C. |
| 32 | 2-Br–C₆H₄–NH₂ | 4FK | 2:1 | Light brown oil, $n_D^{25}=1.5532$. |

| Example No. | Amine | Halogenated acetone [1] | Ratio—amine: halog. acetone | Characterization |
|---|---|---|---|---|
| 33 | Br—C₆H₄—NH₂ | 4FK | | Light brown oil, $n_D^{25}=1.5520$. |
| 34 | Cl—C₆H₄—CH₂NH₂ | 4FK | | Light yellow oil, $n_D^{25}=1.5105$. |
| 35 | (C₄H₉)₂NH | 4FK | | Yellow solid, M.P. 104–110° C. |
| 36 | CH₃—C₆H₃(CH₃)—NH₂ (2,4-dimethylaniline) | 4FK | | White solid, M.P. 49° C. |
| 37 | CH₂(C₆H₄—NH₂)₂ (methylenedianiline) | 4FK | 1:1 | White solid, M.P. 100–116° C. (with decomp.) |
| 38 | CH₃—C₆H₃(NH₂)—NH₂ (diaminotoluene) | 4FK | 1:1 | Light grey solid, M.P. 167° C. |
| 39 | 2,5-dimethylpiperazine (CH₃-CH(NH-CH₂-CH₂-NH-)CH-CH₃) | 4FK | | White solid, M.P. 80–83° C. (decomp.) |
| 40 | NH₂—C₂H₄—NH—C₂H₄—NH—C₂H₄—NH₂ | 4FK | | Viscous oil. |
| 41 | iC₄H₉OOC—C₆H₄—NH₂ | 4FK | 2:1 | Light yellow oil, $n_D^{25}=1.5070$. |
| 42 | Cl—C₆H₃(Cl)—CH₂NH₂ | 4FK | | Bright yellow oil, $n_D^{25}=1.5268$. |
| 43 | CH₃O—C₆H₄—NH₂ | 4FK | 2:1 | Brown oil, $n_D^{25}=1.5290$. |
| 44 | CH₃—C₆H₃(CH₃)—CH₂NH₂ | 4FK | | Light yellow oil, $n_D^{25}=1.5046$. |
| 45 | (2-NH₂—C₆H₄—S—)₂ (2,2'-diaminodiphenyl disulfide) | 4FK | | Very viscous brown oil. |
| 46 | Aniline | 6FK | 2:1 | White solid, M.P. 67° C. |
| 47 | Isopropylamine | 6FK | 1:1 | White solid, M.P. 102° C. |
| 48 | Aniline | 5FK | 2:1 | Grey solid, M.P. 58° C. |
| 49 | Isopropylamine | 5FK | 2:1 | Yellow oil, $n_D^{25}=1.3857$. |
| 50 | 3-aza-bicyclo[3,2,2]-nonane | 4FK | 1:1 | Yellow solid, M.P. 78° C. |
| 51 | Ethylene imine | 4FK | 1:1 | White solid, M.P. 107° C. |
| 52 | 3-amino-1,2,4-triazole | 4FK | 1:1 | White solid, M.P. 70° C. |

| Example No. | Amine | Halogenated acetone [1] | Ratio—amine: halog. acetone | Characterization |
|---|---|---|---|---|
| 53 | 2,6-dimethylpiperidine $\begin{array}{c}\phantom{}\text{CH}_3\\ \text{CH}_2\text{CH}\\ \text{CH}_2\quad\text{NH}\\ \text{CH}_2\text{CH}\\ \phantom{}\text{CH}_3\end{array}$ | 4FK | 1:1 | Brown oil, $n_D^{25}=1.4313$. |
| 54 | $NO_2-\langle\bigcirc\rangle-NHNH_2$ | 4FK | 1:1 | Light brown solid, M.P. 137° C. |
| 55 | $NH_2CH_2CH_2OH$ | 4FK | 1:1 | White solid, M.P. 95° C. |
| 56 | 2-ethylimidazole | 4FK | 1:1 | White solid, M.P. 120° C. |
| 57 | 2-amino-4,6-dimethyl pyrimidine | 4FK | 1:1 | White solid, M.P. 88° C. |
| 58 | Benzotriazole | 4FK | 1:1 | White solid, M.P. 75° C. |
| 59 | 2-aminothiazole | 4FK | 1:1 | Yellow solid, M.P. 106° C. |
| 60 | 2-aminoabenzothiazole | 4FK | 1:1 | White solid, M.P. 156° C. |
| 61 | 2,4-dinitrophenylhydrazine | 4FK | 1:1 | Red oil, $n_D^{25}=1.5742$. |
| 62 | 2-aminopyridine | 4FK | 1:1 | White solid, M.P. 94° C. |
| 63 | p-Aminoacetanilide | 4FK | 1:1 | Grey solid, M.P. 131° C. |
| 64 | 2-aminobenzamide | 4FK | 1:1 | Grey solid, M.P. 94° C. |
| 65 | 3-aminomethylpyridine $\langle\bigcirc_N\rangle-CH_2NH_2$ | 4FK | 1:1 | White solid, M.P. 118° C. |
| 66 | 6-amino-2,4-butidine | 4FK | 1:1 | White solid, M.P. 142° C. |
| 67 | 2-amino-3-picoline | 4FK | 1:1 | Slightly yellow solid, M.P. 98° C. |
| 78 | 2-amino-5-nitropyridine | 4FK | 1:1 | Yellow solid, M.P. 70° C. |
| 69 | 2,6-diaminopyridine | 4FK | 1:2 | Grey solid, M.P. 96° C. |
| 70 | Dimethylaminopropylamine | 4FK | 1:2 | Red oil, $n_D^{25}=1.4519$. |
| 71 | Diethylaminopropylamine | 4FK | 1:2 | Viscous amber oil, $n_D^{25}=1.4508$. |
| 72 | $\begin{array}{c}CH_3\\ \phantom{}\diagdown\\ N-NH_2\\ \diagup\\ CH_3\end{array}$ | 4FK | 1:1 | Yellow liquid, $n_D^{25}=1.4058$. |
| 73 | $C_4H_9NH-CH_2CH_2OH$ | 4FK | 1:1 | White solid, M.P. 111° C. |
| 74 | 2-aminopyrimidine | 4FK | 1:1 | White solid, M.P. 72° C. |
| 75 | Triaminopyrimidine | 4FK | 1:3 | White solid, M.P. 138° C. |
| 76 | Benzimidazole | 4FK | 1:1 | White solid, M.P. 115° C. |
| 77 | do | 4FK | 3:1 | White solid, M.P. 142° C. |
| 78 | Dihydro-2,2,4,6-tetramethyl pyridine $\begin{array}{c}\phantom{}CH_3\\ \phantom{}C\\ CH_3\quad CH\quad C-CH_3\\ \diagdown\,/\quad \|\\ C\quad CH\\ /\quad \diagup\\ CH_3\quad NH\end{array}$ | 4FK | 1:1 | Red liquid, $n_D^{25}=1.4592$. |
| 79 | $CH_3NH-CH_2CH_2CN$ | 4FK | 1:1 | Yellow liquid, $n_D^{25}=1.4370$. |
| 80 | Methoxypropylamine | 4FK | 1:1 | Water clear oil, $n_D^{25}=1.4260$. |
| 81 | $\begin{array}{c}CH_3\\ \diagdown\\ CHO-CH_2CH_2CH_2NH_2\\ \diagup\\ CH_3\end{array}$ | 4FK | 1:1 | Yellow liquid, $n_D^{25}=1.4300$. |
| 82 | $CH_2=C-\underset{\underset{CH_3}{\|}}{\overset{\overset{O}{\|}}{C}}-O-CH_2CH_2NH\underset{\underset{CH_3}{\|}}{\overset{\overset{CH_3}{\|}}{C}}-CH_3$ | 4FK | 1:1 | Visc. yellow oil, $n_D^{25}=1.4532$. |
| 83 | Di-(n-butylamino)-propylamine | 4FK | 1:1 | Orange oil, $n_D^{25}=1.4475$. |
| 84 | Di-(n-butylamino)-propylamine | 4FK | 1:2 | Orange oil, $n_D^{25}=1.4337$. |
| 85 | Melamine | 4FK | 1:3 | White solid, M.P. 65° C. |
| 86 | N-(γ-aminopropyl) morpholine | 4FK | 1:1 | Yellow oil, $n_D^{25}=1.4710$. |
| 87 | 3-chloro-4-benzamido-6-methylaniline $\langle\bigcirc\rangle-\underset{\underset{}{\|}}{\overset{\overset{O}{\|}}{C}}-NH-\underset{\underset{CH_3}{}}{\overset{\overset{Cl}{\|}}{\langle\bigcirc\rangle}}-NH_2$ | 4FK | 1:2 | White solid, M.P. 102° C. |
| 88 | $\begin{array}{c}CH_3\\ \diagdown\\ CH-NH-CH_2CH_2CN\\ \diagup\\ CH_3\end{array}$ | 4FK | 1:1 | Yellow oil, $n_D^{25}=1.4434$. |
| 89 | $NH\begin{array}{c}\diagup CH_2CH_2CN\\ \diagdown CH_2CH_2CN\end{array}$ | 4FK | 1:1 | Visc. yellow oil, $n_D^{25}=1.4594$. |

| Example No. | Amine | Halogenated acetone [1] | Ratio—amine: halog. acetone | Characterization |
|---|---|---|---|---|
| 90 | Imidazole | 4FK | 1:1 | White solid, M.P. 102° C. |
| 91 | 2-phenacylmercapto-2-imidazoline | 4FK | 1:1 | Yellow solid, M.P. 122° C. |
| 92 | Hexahydro-1,3,5-triphenyl-s-triazine | 4FK | 1:3 | Red oil, $n_D^{25}=1.5110$. |
| 93 | Casein | 4FK | | Yellow oil, $n_D^{25}=1.4283$. |
| 94 | 2-cyanimino-4-methylpyrimidine | 4FK | 1:2 | Yellow solid, M.P. 197° C. |
| 95 | 2-amino-4-hydroxy-6-methyl pyrimidine | 4FK | 1:1 | Syrupy product, $n_D^{25}=1.4430$. |
| 96 | 2-amino-4-chloro-6-methyl pyrimidine | 4FK | 1:1 | White solid, M.P. 100° C. |
| 97 | Furfurylamine | 4FK | 1:1 | Colorless oil, $n_D^{25}=1.4524$. |
| 97 | 1,3-diphenyltriazene | 4FK | 1:1 | Dark brown oil. |
| 99 | Et$_3$N-salt of HOOC—CH$_2$S—⟨⟩—NH$_2$ | 4FK | 1:1 | Gel. |
| | | 4FK | 1:1 | Yellow product, $n_D^{25}=1.5017$. |
| 100 | Phenylhydrazine | 4FK | 1:1 | White solid, M.P. 59° C. |
| 101 | 2-benzylamino-4,5-dihydro imidazole | 4FK | 1:1 | Yellow solid, M.P. 131° C. |
| 102 | Phenylazoaniline | 4FK | 1:1 | Dark oil. |
| 103 | Sulfapyridine | 4FK | 1:2 | White solid. |
| 104 | Sulfathiazole | 4FK | 1:3 | White solid, M.P. 175° C. |
| 105 | Sulfathiazole | 4FK | 1:1 | White solid (decomposes over 100° C.). |
| 106 | Sulfapyridine | 4FK | 1:1 | White solid (decomposes gradually on heating). |
| 107 | Sulfaguanidine | 4FK | 1:1 | Glassy semi-solid. |
| 108 | Glycine ethyl ester | 4FK | 1:1 | Yellow oil, $n_D^{25}=1.4322$. |
| 109 | 2-amino-4-chloro-6-methyl-pyrimidine | 6FK | 1:1 | White solid, M.P. 64° C. |
| 110 | 2-cyanimino-4-methyl-pyrimidine | 6FK | 1:1 | Viscous yellow oil. |
| 111 | t-Butylaminomethacrylate | 6FK | 1:1 | Rubber-like polymerizate. |
| 112 | (CH$_3$)$_2$N—NH$_2$ | 6FK | 1:1 | Colorless oil, $n_D^{25}=1.3340$. |
| 113 | 3-amino-5-pyrazolone | 4FK | 1:2 | Red viscous oil, $n_D^{25}=1.4578$. |
| 114 | 2-amino-5-chloropyridine | 4FK | 1:1 | White solid, M.P. 76° C. |
| 115 | 3-amino-1-phenyl-2-pyrazolin-5-one | 4FK | 1:1 | White solid, M.P. 95-110 °C. |
| 116 | 2,4-diaminoazobenzene | 4FK | 1:2 | Red viscous oil. |
| 117 | 1-methylpiperazine | 4FK | 1:1 | Red viscous oil. |
| 118 | 2-methylpiperazine | 4FK | 1:2 | Yellow oil, $n_D^{25}=1.4538$. |
| 119 | O-phenylenediamine | 4FK | 1:1 | Tan solid, M.P. 85° C. |

| Example No. | Amine | Halogenated acetone [1] | Ratio—amine:halog. acetone | Characterization |
|---|---|---|---|---|
| 120 | 4-nitrophenylenediamine | 4FK | 1:2 | Brown oil, $n_D^{25}=1.435$. |
| 121 | CH₃NH—NH₂ | 4FK | 1:2 | Clear yellow oil, $n_D^{25}=1.4210$. |
| 122 | 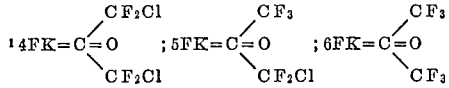 | 4FK | 1:1 | White solid (decomposes on heating gradually, melts at 250° C.). |
| 123 | Sulfanilamide  H₂N—⟨ ⟩—SO₂NH₂ | 4FK | 1:1 | White solid, M.P. 83° C. |
| 124 | N-sulfanilylbenzamide | 4FK | 1:1 | White solid, M.P. 175–80° C. |
| 125 | 4,4'-sulfonyl dianiline | 4FK | 1:2 | Visc. yellow oil, $n_D^{25}=1.5133$. |
| 126 | Ethylenediamine | {4FK, 6FK} | 1:2 | Visc. oil, $n_D^{25}=1.4005$. |
| 127 | Phenylacetoguanamine | 4FK | 1:1 | White solid, M.P. 88° C. |
| 128 | Thiurat 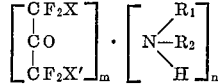 | 4FK | 1:2 | Red viscous oil, $n_D^{25}=1.4681$. |

[1] $4FK=\begin{matrix}CF_2Cl\\C=O\\CF_2Cl\end{matrix}$ ; $5FK=\begin{matrix}CF_3\\C=O\\CF_2Cl\end{matrix}$ ; $6FK=\begin{matrix}CF_3\\C=O\\CF_3\end{matrix}$ The systemic fungicidal activity of the above described addition complexes is indicated in the table below:

TABLE

| Example No. | Foliage bean rust 1,000 p.p.m. | 500 p.p.m. | 100 p.p.m. | Test tube systemic p.p.m. Rust | Mildew |
|---|---|---|---|---|---|
| 10 | +++ | ++ | + | 5 | >50 |
| 11 | 100 | 100 | 100 | *1 | 10 |
| 1 | 100 | 100 | ++++ | *(1) | >50 |
| 12 | | | | 10 | *50 |
| 13 | | | | >50 | >50 |
| 14 | +++ | | | 25 | >50 |
| 15 | ++ | | | >50 | >50 |
| 16 | ++ | | | (25) | >50 |
| 17 | | | | >50 | >50 |
| 18 | | | | 10 | 25 |
| 19 | ++ | +++ | | (25) | >50 |
| 20 | ++++ | +++ | | 10 | >50 |
| 21 | 100 | 100 | ++++ | *50 | *10 |
| 22 | 100 | 100 | ++++ | | 25 |
| 23 | 100 | 100 | 100 | *50 | >50 |
| 24 | 100 | 100 | 100 | *50 | >50 |
| 25 | 100 | 100 | 100 | *50 | >50 |
| 2 | 100 | ++++ | ++++ | *50 | >50 |
| 26 | 100 | 100 | 100 | *50 | (25) |
| 27 | 100 | 100 | ++++ | *50 | >50 |
| 28 | ++++ | + | | >50 | >50 |
| 29 | 100 | 100 | +++ | *50 | *(10) |
| 30 | 100 | 100 | +++ | *50 | 25 |
| 31 | 100 | 100 | +++ | *50 | (25) |
| 32 | 100 | ++++ | ++++ | *50 | 50 |
| 33 | 100 | 100 | 100 | *50 | 25 |
| 34 | 100 | 100 | ++++ | *50 | 25 |
| 35 | ++++ | ++++ | ++++ | *50 | >50 |
| 36 | ++++ | ++++ | | | 50 |
| 37 | ++++ | ++++ | +++ | | >50 |
| 38 | ++++ | ++++ | | | >50 |
| 39 | 100 | ++++ | ++ | | >50 |
| 40 | | | | | >50 |
| 41 | 100 | 100 | 100 | *50 | *10 |
| 42 | | | | *50 | >50 |
| 43 | +++ | ++ | | 50 | 50 |
| 44 | 100 | ++++ | ++++ | *50 | 50 |
| 45 | 100 | 100 | ++++ | *50 | >50 |
| 127 | 100 | 100 | ++++ | 5 | 50 |
| 52 | 100 | 100 | 100 | 5 | 50 |
| 46 | 100 | 100 | 100 | 1 | 10 |
| 48 | 100 | 100 | 100 | 5 | 25 |
| 56 | 100 | 100 | 100 | 5 | 25 |
| 54 | 100 | 100 | 100 | 5 | 50 |
| 52 | 100 | 100 | 100 | 1 | 50 |
| 51 | 100 | 100 | ++++ | 5 | >50 |
| 59 | 100 | 100 | ++++ | | |

NOTE.—++++ >90% control; +++ >75% control; ++ >40% control; + >10% control.
*=lowest concentration (p.p.m.) tested to date.
()=inhibition of some degree at p.p.m. indicated.

We claim:

1. A complex of an organic amine with a completely halogenated acetone and having the following formula:

$$\begin{bmatrix} CF_2X \\ CO \\ CF_2X' \end{bmatrix}_m \cdot \begin{bmatrix} R_1 \\ N-R_2 \\ H \end{bmatrix}_n$$

wherein R₁ and R₂ are selected from the class consisting of hydrogen, an alkyl radical of from 1 to 18 carbon atoms, an alkenyl radical of from 1 to 18 carbon atoms selected from the group consisting of cyclopentyl, cyclohexyl, 1-cyclopentenyl, 2-cyclopentenyl, 3-cyclopentenyl, 4-vinylcyclohexyl, 1-cyclohexenyl, 2-cyclohexenyl, 3-cyclohexenyl, 2(3-cyclohexenyl)-ethyl-3-vinylcyclohexyl, 4-ethyl-1-cyclohexenyl and 4-isopropyl-2-cyclohexenyl, an alkynyl radical of from 1 to 9 carbon atoms, a non-aromatic carbocyclic radical of from 5 to 6 carbon atoms, an aralkyl radical wherein the alkyl portion is lower alkyl and the aryl portion is an unsubstituted phenyl or naphthyl radical, an aromatic hydrocarbon radical selected from the class consisting of unsubstituted phenyl and naphthyl radicals, an amino radical, cyano, and a heterocyclic radical selected from the group consisting of 2-pyridyl, 3-pyridyl, oxazolyl, thiazolyl, pyrrolyl, triazolyl, tetrazolyl, oxadiazolyl, oxatriazolyl, diazolyl, furfuryl, diazinyl, 2-thiazolidyl, 4,5 - dimethyl-2-thiazolidyl, 2-pyrimidyl, 4-phenyl-2-oxazolyl, pyranyl, benzimidazolyl, pyrazolonyl, B-naphthothiazolyl, triazinyl and oxazinyl, and when taken together $R_1$ and $R_2$ may form a heterocyclic ring system selected from the group consisting of pyrrole, pyrrolidine, imidazole, imidazoline, imidazolidine, piperazine, morpholine, isorazine, dioxazole, tetrazole, 3-azobicyclo - [3,2,2] - nonane, ethyleneimine, 2,6-dimethylpiperidine, benzotriazol, benzimidazole, it being provided that the aforesaid radicals may have attached thereto a functional moiety selected from the class consisting of halogen, —CN, —SCN, —COOR, —SO₂NR₂, —SOR, —SO₃R, —CONR₂, —CONHR, —OH, —SH, —NR₂, —NHR, —NH₂, —OR, —SR, —OC(O)R,

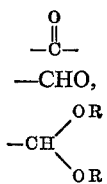

—CHO,

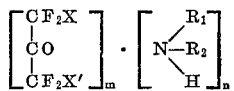

—NO₂, and —N=N, wherein R can be an organic radical of the type above defined for $R_1$ and $R_2$, X and X' are chlorine, and n and m are integers of from 1 to 3 with the proviso that n and m are identical when equal to unity.

2. A method of preparing a chemical complex of the following formula:

$$\begin{bmatrix} CF_2X \\ | \\ CO \\ | \\ CF_2X' \end{bmatrix}_m \cdot \begin{bmatrix} R_1 \\ \diagup \\ N-R_2 \\ \diagdown \\ H \end{bmatrix}_n$$

wherein $R_1$ and $R_2$ are selected from the class consisting of hydrogen, an alkyl radical of from 1 to 18 carbon atoms, an alkenyl radical of from 1 to 18 carbon atoms, selected from the group consisting of cyclopentyl, cyclohexyl, 1-cyclopentenyl, 2-cyclopentenyl, 3-cyclopentenyl, 4-vinylcyclohexyl, 1-cyclohexenyl, 2-cyclohexenyl, 3-cyclohexenyl, 2(3 - cyclohexenyl)ethyl-3-vinylcyclohexyl, 4-ethyl-1-cyclohexenyl and 4 - isopropyl-2-cyclohexenyl, an alkynyl radical of from 1 to 9 carbon atoms, a non-aromatic carbocyclic radical of from 5 to 6 carbon atoms, an aralkyl radical wherein the alkyl portion is lower alkyl and the aryl portion is an unsubstituted phenyl or naphthyl radical, an aromatic hydrocarbon radical selected from the class consisting of unsubstituted phenyl and naphthyl radicals, an amino radical, cyano, and a heterocyclic radical, selected from the group consisting of 2-pyridyl, 3-pyridyl, oxazolyl, thiazolyl, pyrrolyl, triazolyl, tetrazolyl, oxadiazolyl, oxatriazolyl, diazolyl, furfuryl, diazinyl, 2-thiazolidyl, 4,5-dimethyl-2-thiazolidyl, 2-pyrimidyl, 4-phenyl-2-oxazolyl, pyranyl, benzimidazolyl, pyrazolonyl, B-naphthothiazolyl, triazinyl, and oxazinyl, it being provided that the aforesaid radicals may have attached thereto a functional moiety selected from the class consisting of halogen, —CN, —SCN, —COOR, —SO₂NR₂, —SO₂R, —SOR, —SO₃R, —CONR₂, —CONHR, —OH, —SH, —NR₂, —NHR, —NH₂, —OR, —SR, —OC(O)R, —CHO,

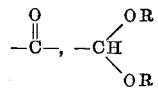

—NO₂, and —N=N, wherein R can be an organic radical of the type above defined for $R_1$ and $R_2$, X and X'; are chlorine, and n and m are integers of from 1 to 3 with the proviso that n and m are identical when equal to unity, which consists of reacting 1 to 2 moles of an organic amine of the formula:

wherein $R_1$ and $R_2$ have the values as above designated, with 1 to 2 moles of a fully halogenated acetone of the formula:

wherein X and X' have the values as above designated, and isolating the so-formed chemical complex.

References Cited

UNITED STATES PATENTS

| | | | |
|---|---|---|---|
| 2,853,524 | 9/1958 | Miller et al. | 260—593 |
| 3,226,439 | 12/1965 | Middleton et al. | 260—566 |
| 3,323,984 | 6/1967 | Szabo et al. | 260—593 |

OTHER REFERENCES

Taboury et al., Bull. Soc. Chim. France 1947, pp. 783–789.

Knunyants et al., Izv. Akad. Nauk SSSR, Otd. Khim. Nauk 1962, pp. 684–692; Zeifman et al., Dokl. Akad. Nauk SSSR, vol. 153, pp. 1330 to 1337 (1963).

Chemical Abstracts, vol. 54, cols. 20962 to 20963 (1960).

Chemical Abstracts, vol. 63, col. 482 (1965), (abstract of Knunyants et al.).

Middleton et al., J. Org. Chem., vol. 30, pp. 1398 to 1402 (1965), (abstract of Zeifman et al.).

JOHN D. RANDOLPH, Primary Examiner

U.S. Cl. X.R.

260—192, 205, 239, 239.8, 239.95, 247.5, 248, 249.9, 256.4, 268, 294.7, 296, 297, 306.8, 308, 309, 310, 326.8, 347.7, 397.7, 465.4, 471, 482, 558, 569, 570.5, 576, 579, 583, 593, 999